US011951044B2

(12) United States Patent
Alexander

(10) Patent No.: US 11,951,044 B2
(45) Date of Patent: Apr. 9, 2024

(54) PRIVACY ENCLOSURE FOR PATIENT ON STRETCHER

(71) Applicant: Diego G Alexander, Houston, TX (US)

(72) Inventor: Diego G Alexander, Houston, TX (US)

( * ) Notice: Subject to any disclaimer, the term of this patent is extended or adjusted under 35 U.S.C. 154(b) by 27 days.

(21) Appl. No.: 17/466,099

(22) Filed: Sep. 3, 2021

(65) Prior Publication Data

US 2023/0076698 A1 Mar. 9, 2023

(51) Int. Cl.
*A61G 10/00* (2006.01)
*A61G 1/04* (2006.01)

(52) U.S. Cl.
CPC ............ *A61G 10/005* (2013.01); *A61G 1/04* (2013.01)

(58) Field of Classification Search
CPC ................................ A61G 10/005; A61G 1/04
USPC ............................................................ 5/621
See application file for complete search history.

(56) References Cited

U.S. PATENT DOCUMENTS

| | | | | | |
|---|---|---|---|---|---|
| 1,342,354 | A * | 6/1920 | Schoonmaker | A47C 29/006 | 135/90 |
| 4,635,667 | A * | 1/1987 | Harn | A47C 7/66 | 135/90 |
| 5,511,259 | A * | 4/1996 | Tarara | A61G 1/04 | 135/147 |
| 2012/0192905 | A1* | 8/2012 | Boss | A47C 7/666 | 135/141 |
| 2016/0010358 | A1* | 1/2016 | Ashley | A47C 1/143 | 135/96 |

* cited by examiner

*Primary Examiner* — Justin C Mikowski
*Assistant Examiner* — Adam C Ortiz
(74) *Attorney, Agent, or Firm* — Patshegen IP; Moshe Pinchas

(57) ABSTRACT

A privacy enclosure that allows patients on stretchers to conveniently cover their face or torso during transports in public areas, during their stay at a hospital rooms and/or when a stable hospitalized individual is transported on a stretcher or bed from one area to another. The invention provides protection in order to respect and protect the privacy and dignity of patients. This device is intended, but is not limited to, being attached to a stretcher, either by the nursing staff or by the patient himself.

11 Claims, 14 Drawing Sheets

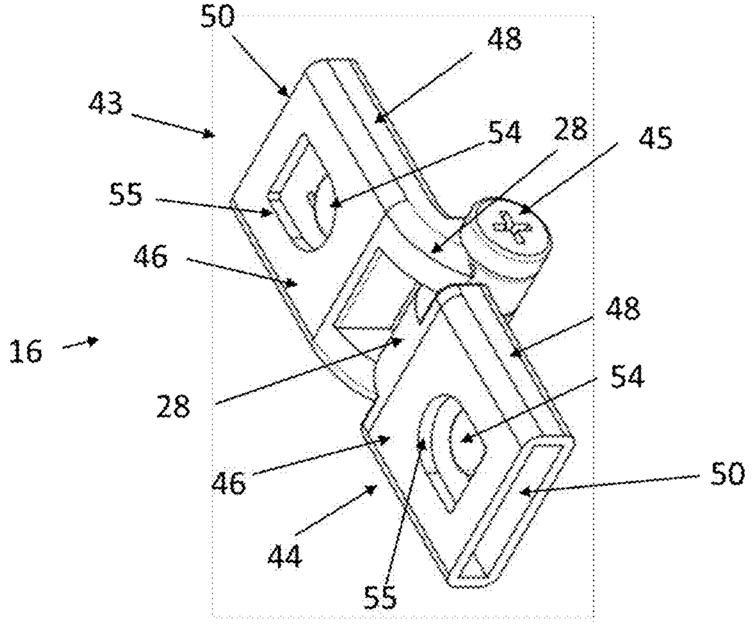
Fig 21
Fig 22
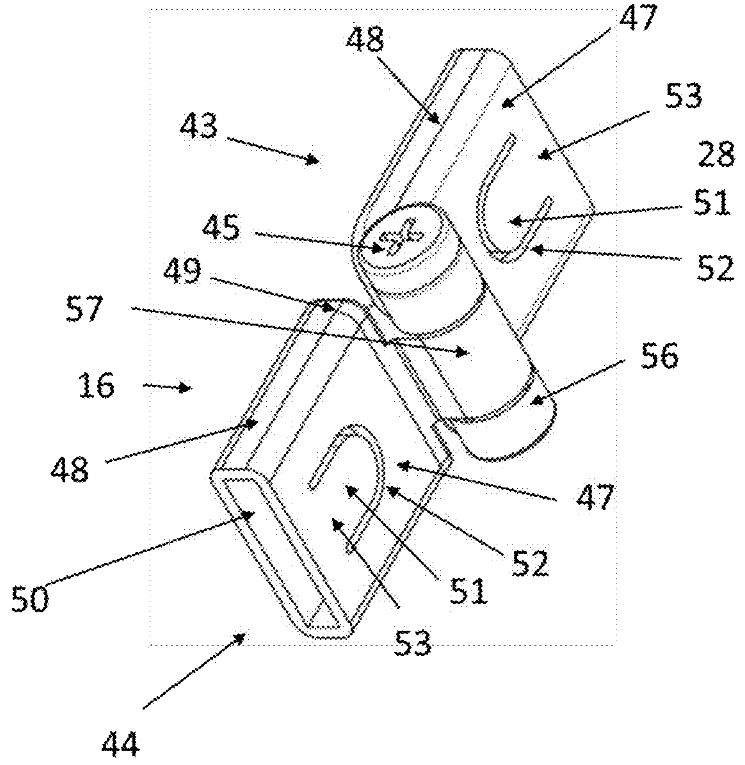

PRIVACY ENCLOSURE FOR PATIENT ON STRETCHER

FIELD OF THE INVENTION

The present disclosure generally relates to a privacy enclosure for a patient on a stretcher.

BACKGROUND OF THE INVENTION

Patients on a gurney, stretcher or in a hospital bed, often experience the discomfort of being in sight of passersby, being exposed to inclement weather, or to lights when being transferred around or out of the hospital. These conditions cause discomfort for patients preferring to have privacy. To solve these problems, numerous folding curtains have been developed which are attached to the stretchers or beds in order to provide privacy. An invention disclosed in document U.S. Pat. No. 5,511,259 refers to a folding cover for stretchers or beds, with first and second non-transparent side panels and a transparent central panel, such side panels provide privacy for a person being transported on the stretcher while at the same time medical personnel can see the patient through the stretcher.

Patent document US20170145711 discloses a protective enclosure providing privacy to the patient and protection against inclement weather to a patient on a mattress on a stretcher. The enclosure includes a pair of self-slide base portions and a cover connected to the base portions. The base parts can move up and out of each other in a common transverse plane under the mattress along a transverse axis that extends the width of the mattress. The cover delimits an interior space in which a part of the patient's body is received. The cover has an upper structure that extends along the transverse axis above the common transverse plane.

Patent document U.S. Pat. No. 9,750,349 discloses a cover with a hinged frame and a mosquito net, having a single horizontal rod, with the second ends of the first support spanning a width of the bed frame. The first and second legs have a top and a bottom. The pivot assembly is located close to the header. The mosquito net is placed on the bed and fixed to the horizontal rod through a first fixing unit. The articulated frame assembly can be operated in the deployed and retracted positions. The first and second legs move to a vertical position between the deployed position and the retracted position.

In addition, there are folding covers for stretchers or beds that partially or totally cover the upper part of the patient and that are attachable to said stretchers or beds such as those disclosed in documents U.S. Pat. Nos. 8,464,379, 9,644,390, 6,076,206, KR1536311, US20050241648, JP04501552.

However, these covers are very cumbersome, difficult to keep clean and the structures are complex to assemble and very difficult to disassemble, in addition the structures that can be attached to stretchers or beds are unstable.

These problems are solved by the privacy enclosure of the present invention, since it uses a disposable paper cover, has crossbars and crossbar connectors that make it easy to assemble and disassemble, and is easy to install on and to remove from the mattress or stretcher.

SUMMARY OF THE INVENTION

According to an aspect of the invention, a privacy enclosure for a patient on a stretcher, includes: a mount for mounting the enclosure on the stretcher;

a pair of support beams extending from the mount in parallel spaced relation to each other; a pair of rotating beams, each said rotating beams connected to a respective free end of the support beams for pivoting of the rotating beams relative to the support beams;

a first crossbeam extending transversely between the rotating beams and connecting the rotating beams at a respective free end thereof; and a disposable paper cover attached to the support beams and the rotating beams, and shaped so that when the rotating beams rotate, the cover folds or unfolds covering or uncovering the user.

According to another advantageous feature of the invention, the mount can include a pair of L-shaped members having a horizontal section and a vertical section, wherein the support beams each have a vertical section which is attached to the vertical section of a respective one of the L-shaped members.

According to another advantageous feature of the invention, the enclosures further includes a second crossbeam having opposing ends respectively attached to the vertical sections of the L-shaped members.

According to another advantageous feature of the invention, the enclosures further includes connectors fixedly attached to the vertical section of a respective one of the L-shaped members, wherein the connectors each have a first channel and a second channel oriented perpendicular to the first channel, wherein the vertical section of the support beams are received in the first channel, and the ends of the second crossbeam are received in the second channel.

According to another advantageous feature of the invention, the support beams can include a plurality of aligned holes, wherein an inner wall of the first channel has a flexibly movable tab releasably engageable in the aligned holes for adjustment of a position of the L-shaped members along the vertical section of the support beams.

According to another advantageous feature of the invention, the first crossbeam can have a generally central handle.

According to another advantageous feature of the invention, the rotating beams and the support beams are connected to each other by a respective hinged connector.

BRIEF DESCRIPTION OF THE DRAWINGS

Other features and advantages of the present invention will be more readily apparent upon reading the following description of currently preferred exemplified embodiments of the invention with reference to the accompanying drawing, in which:

FIG. 21 is a top axonometric view of the hinge.

FIG. 22 is a lower axonometric view of the hinge.

DETAILED DESCRIPTION OF THE INVENTION

Figure 1:
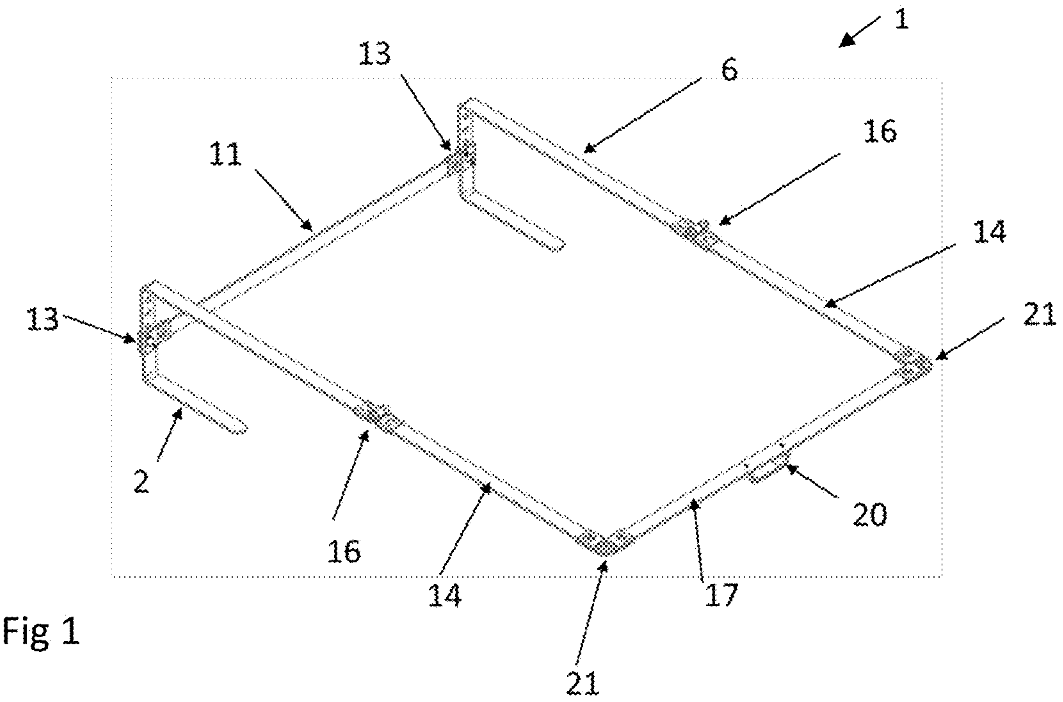
FIG. 1 is a top axonometric view of the assembled structure of the cover.
Figure 2:
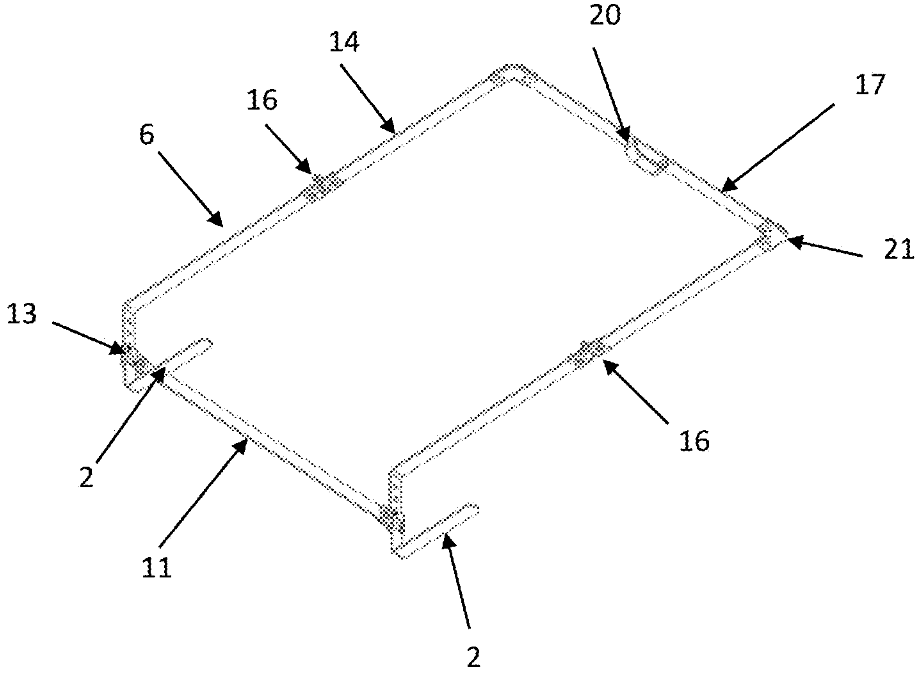
FIG. 2 is a lower axonometric view of the assembled structure of the cover.
Figure 3:
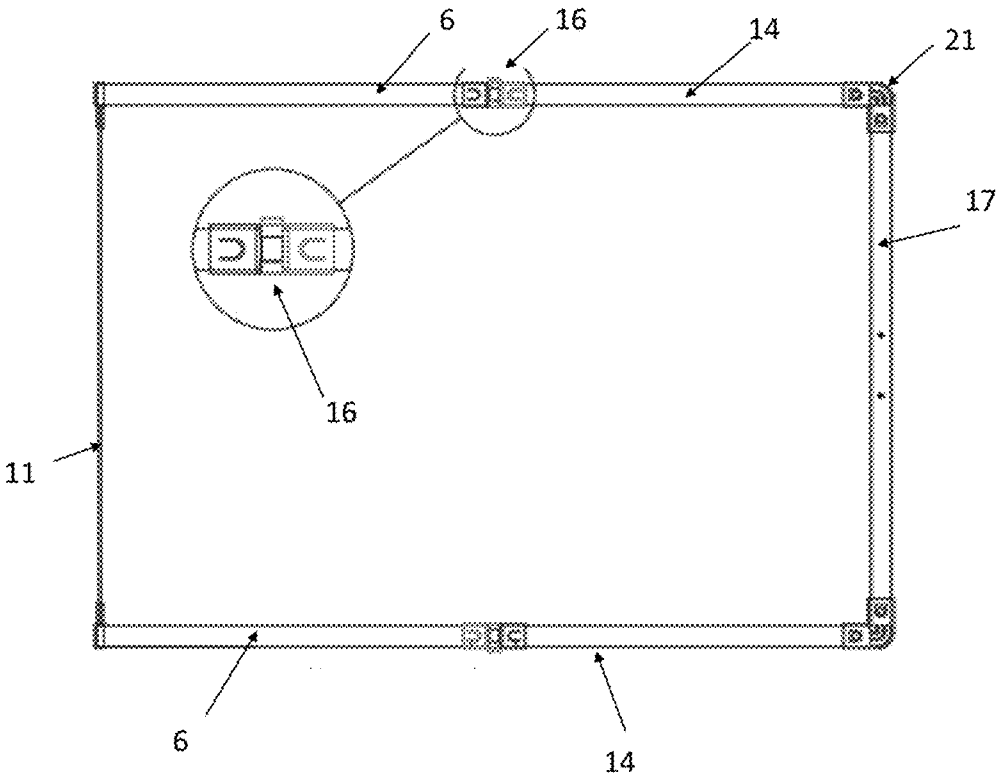
FIG. 3 is a bottom view of the assembled structure of the cover.
Figure 4:
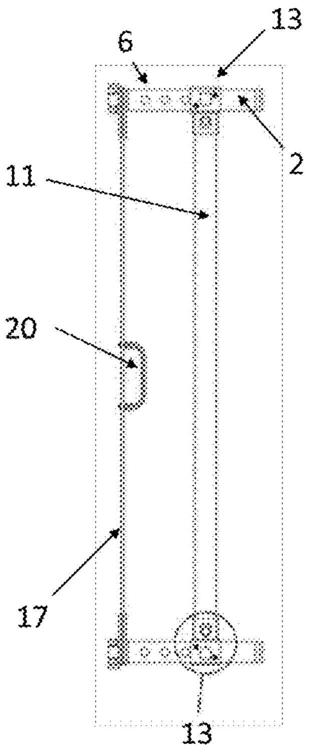
FIG. 4 is a front view of the assembled structure of the cover.
Figure 5:
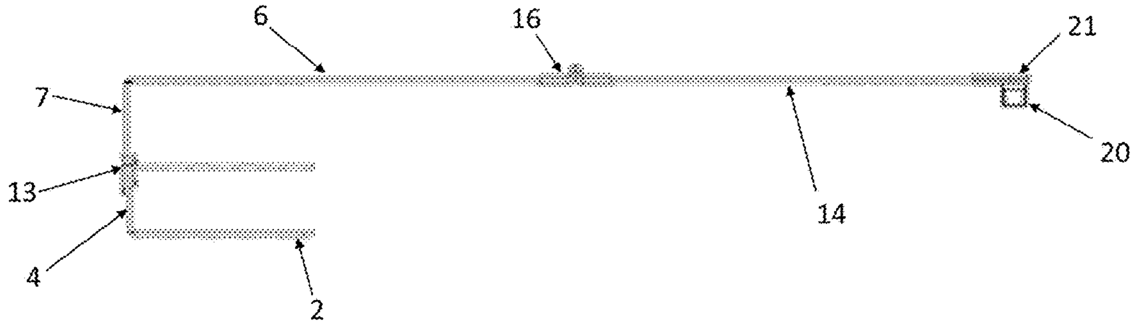
FIG. 5 is a side view of the assembled structure of the cover.
Figure 6:
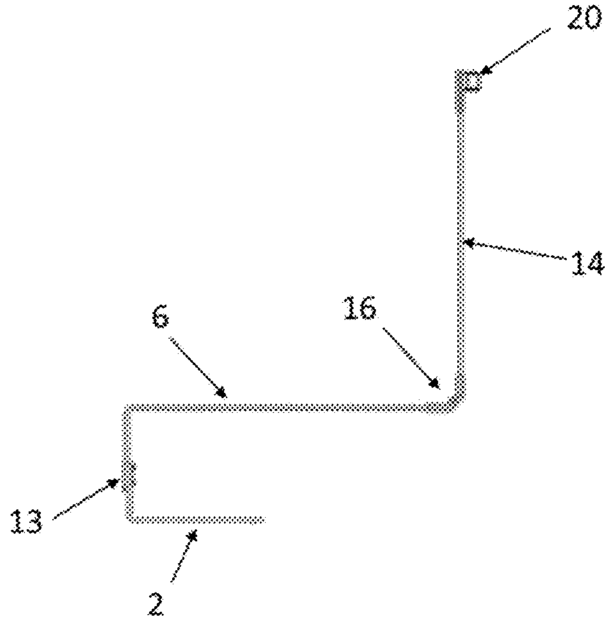
FIG. 6 is a side view of the assembled structure of the cover, where the rotating beam is at 90 degree relative to the support beam.
Figure 7:
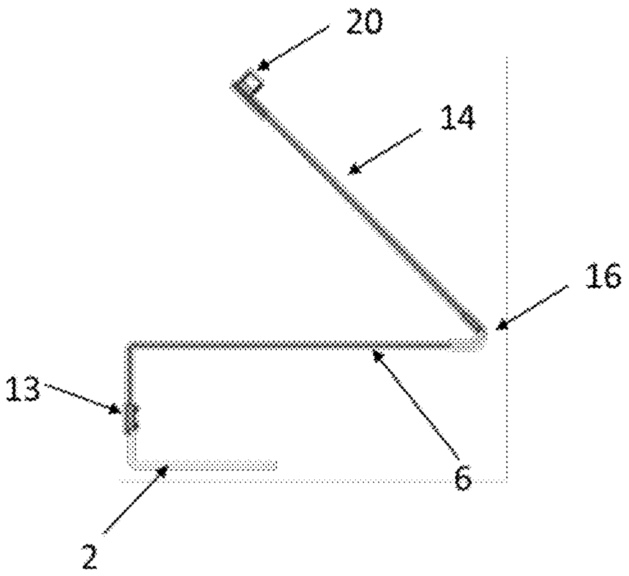
FIG. 7 is a side view of the assembled structure of the cover, where the rotating beam is at more than 90 degree relative to the support beam.
Figure 8:
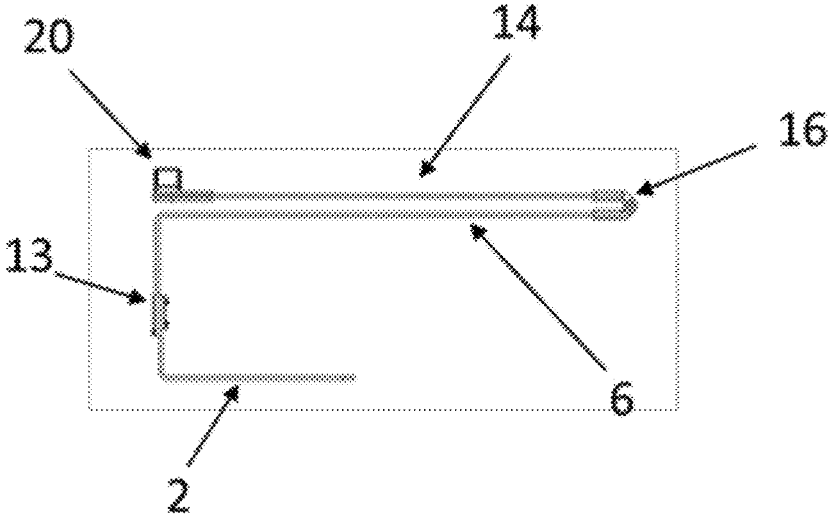
FIG. 8 is a side view of the assembled structure of the cover, where the rotating beam is at 180 degree relative to the support beam.
Figure 9:
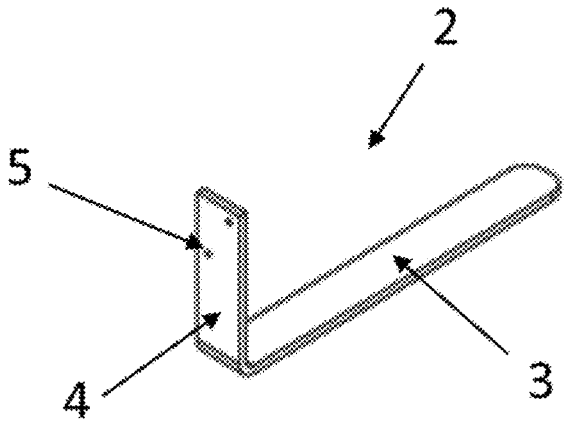
FIG. 9 is an axonometric view of the fastening support.
Figure 10:
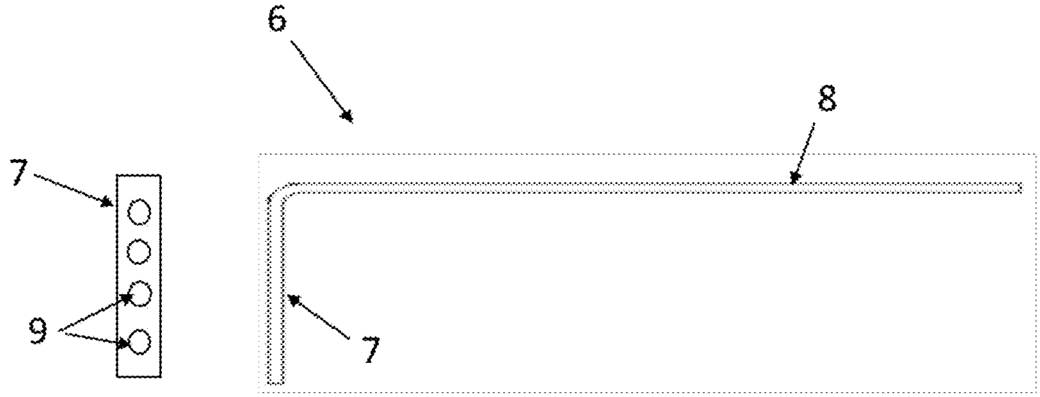
FIG. 10 is a side and rear view of the support beam.

Throughout all the Figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

In order to solve the problem of the daily need of the human being to have privacy in a hospital or similar space, a device capable of providing an atmosphere of intimacy around the patient was developed. This solution is efficient in the use of space, as the stretcher maintains its original scale.

Referring to FIG. 1, there is shown an embodiment of the privacy enclosure for a patient on a stretcher according to the present invention indicated with reference numeral 1. The privacy enclosure includes a mount, in the shown embodiment constructed as a pair of parallel L-shaped fastening supports (2), with a horizontal section (3) and a shorter vertical section (4). An advantage of the mount in the embodiment of FIG. 1 is that the horizontal section (3) can be inserted under the mattress from the side of the bed header, and is held down by the weight of the mattress and the user. The vertical section (4) projects upwards on the side of the bed header. The mount is not limited to the shown structure and can be any structure known to the skilled person for mounting the enclosure on the stretcher or bed such as clamps, screws, brackets, etc.

Figure 11:
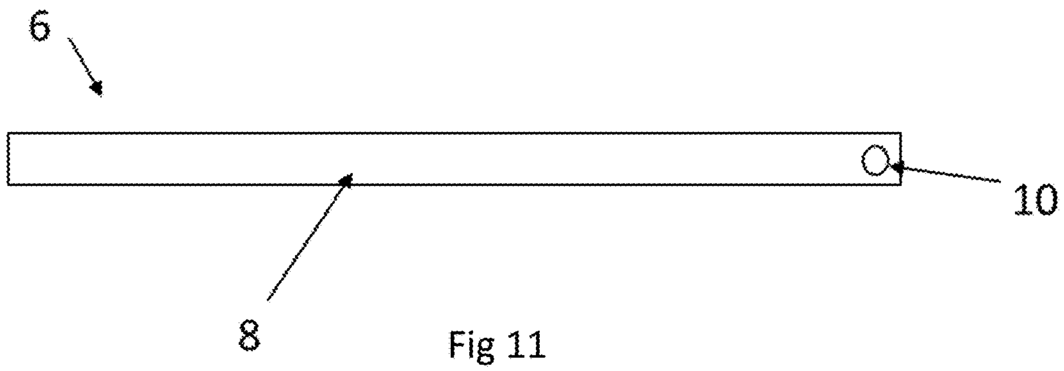
FIG. 11 is a top view of the fastening support.
Figure 12:
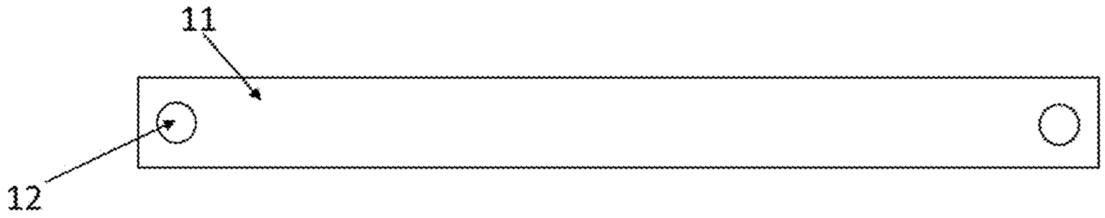
FIG. 12 is a top view of the first crossbar.
Figure 13:
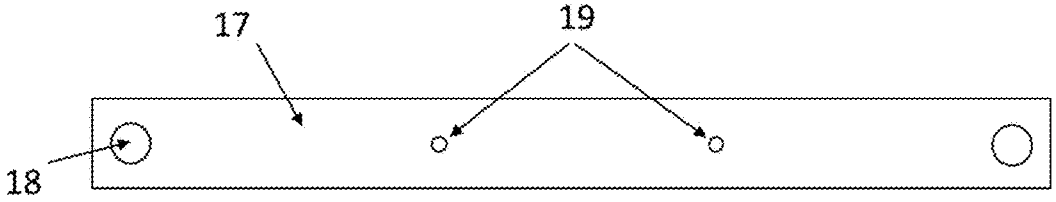
FIG. 13 is a top view of the second crossbar.
Figure 14:
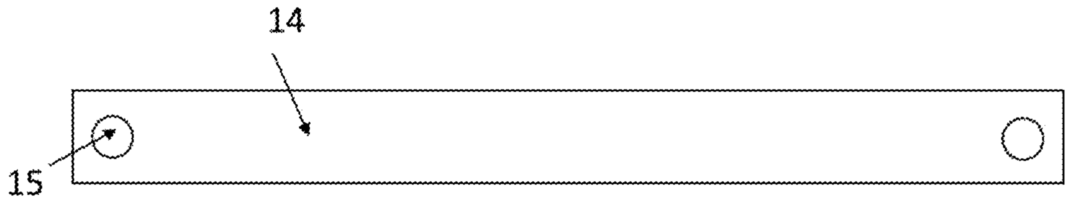
FIG. 14 is a top view of the rotating beam.

The enclosure also includes a pair of parallel and spaced apart L-shaped support beams (6), having a vertical section (7) and a longer horizontal section (8). The support beams (6) are arranged relative to the fastening supports (2), so that the vertical section (7) of the support beams (6) partially overlap with the vertical section of the fastening support (2) and are attached to the vertical section (4) of the fastening support (2) via connectors (13). The vertical section (7) of the support beams (6) has a plurality of longitudinally aligned holes (9), and a fixing hole (10) which is shown in more detail in FIG. 11.

A transversely extending crossbar (11) is attached to the vertical sections (7) of the support beams (6) via the connectors (13), and serves to provide stability.

The enclosure of the embodiment shown in FIG. 1 further includes a pair of rotating beams (14), which are joined at one of their ends to the free end of support beam (6), by means of a hinge (16). The rotating beams (14) are pivotal relative to the support beams (6) between a folded position, in which the support beams and the rotating beams come to lie face to face with each other, and an extended position in which the rotating beams (14) are coplanar to the horizontal section (8) of the support beam (6). In the folded position, the support beams and the rotating beams enclose an angle of essentially 0 degrees and in the extended position an angle of essentially 180 degrees.

The embodiment shown in FIG. 1 also includes crossbar (17) which is connected to the ends of the rotating beams (14) via corner connectors (21). The handle is fixed to the crossbar (17) via fasteners inserted into holes (19).

Figure 15:
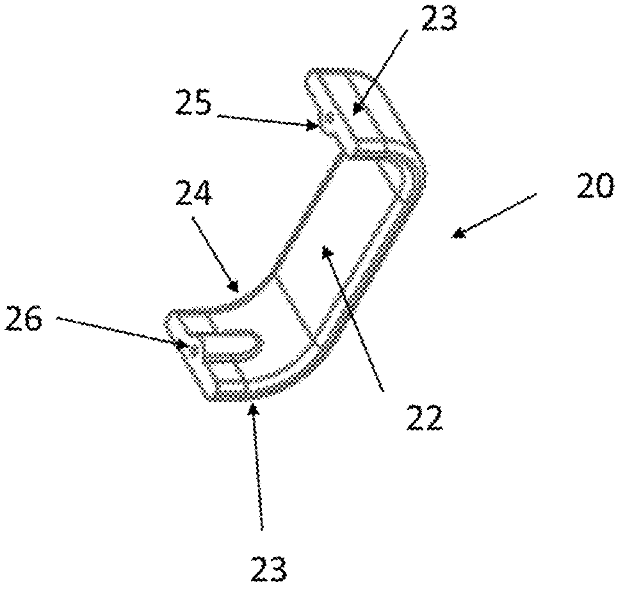
FIG. 15 is an axonometric view of the handle.
Figure 16:
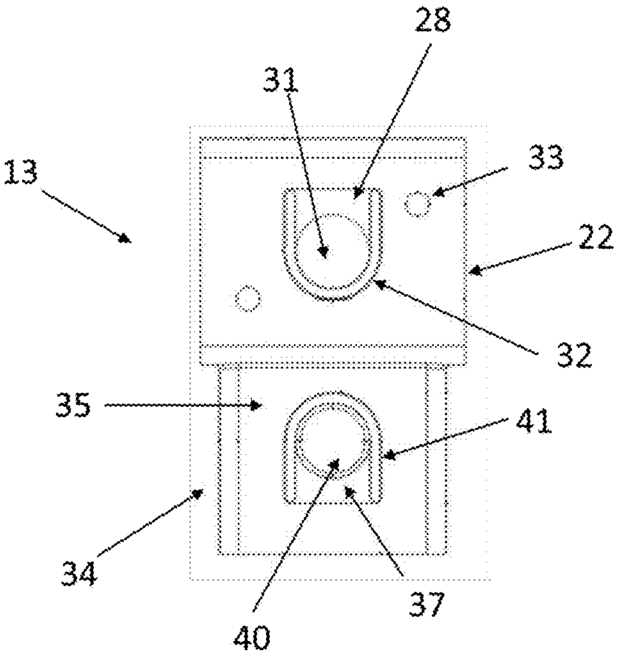
FIG. 16 is a front view of the connector.
Figure 17:
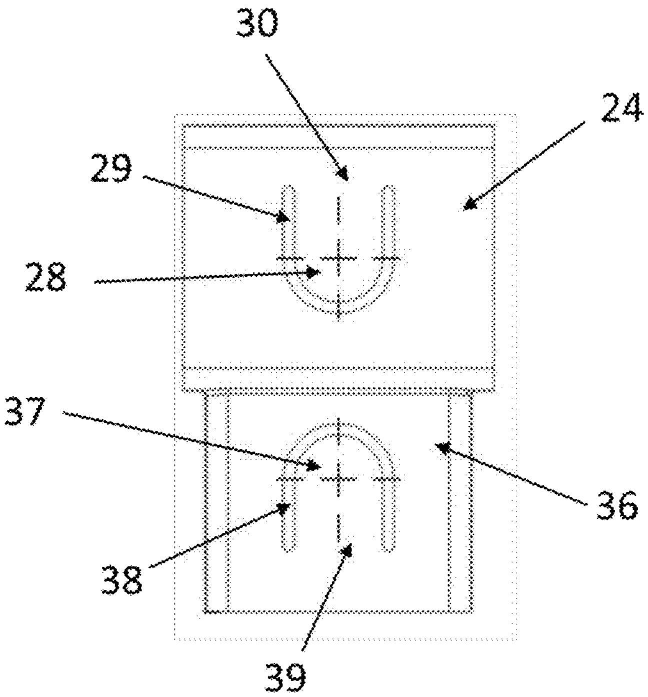
FIG. 17 is a rear view of the connector.
Figure 18:
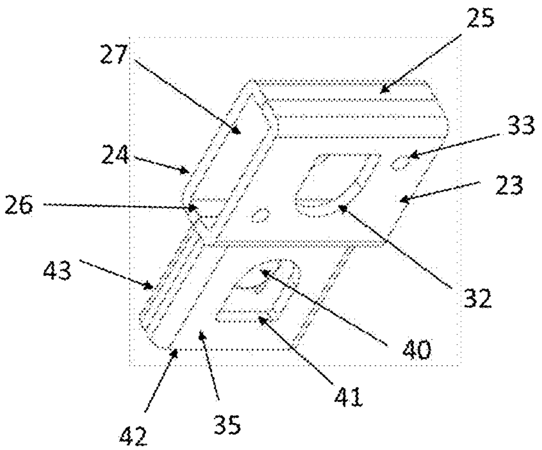
FIG. 18 is an axonometric view of the connector.
Figure 19:
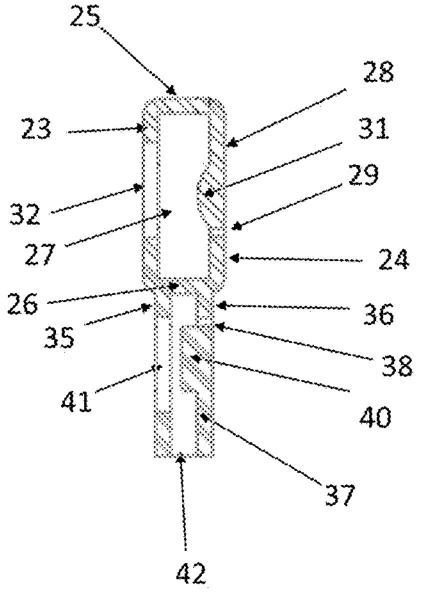
FIG. 19 is a longitudinal sectional view of the connector.
Figure 20:
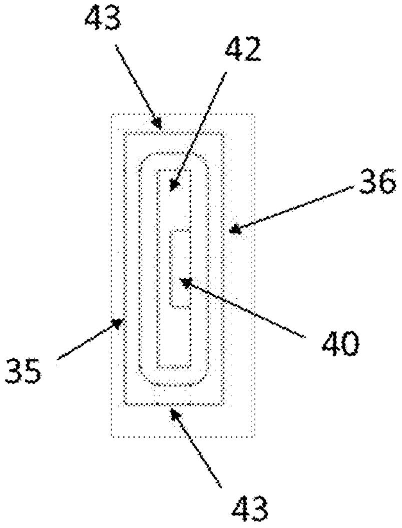
FIG. 20 is a bottom view of the connector.

With reference to FIG. 15, the handle or lug (20) has a "U" shape defining an elongated wall (22) from which the two ends (23) project, defining a curvature (24), said ends (23) of the handle (20), on their inner face have a rib (25) with a hole (26) coinciding with the through holes (19) of the crossbar (17) so that the fixing means (not illustrated) penetrate and the handle (20) is fixedly attached to the mobile crossbar (17). In this way the user can hold the handle (20) and push it up or down by rotating the rotating beams (14) to the desired position.

Figure 23:
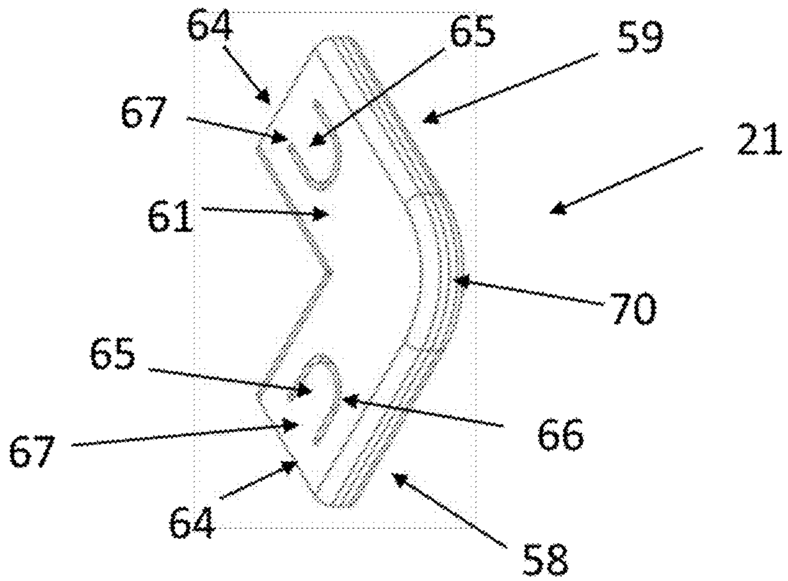
FIG. 23 is a lower axonometric view of the corner connector.
Figure 24:
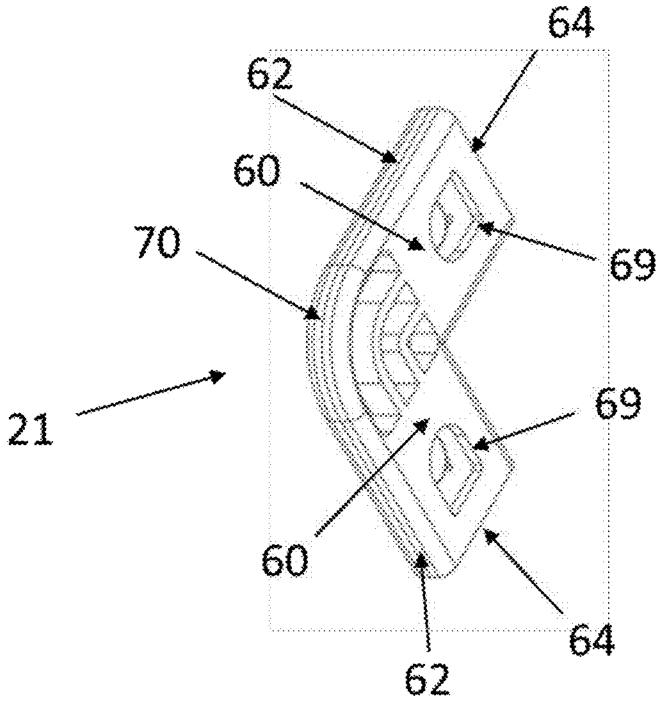
FIG. 24 is a top axonometric view of the corner connector.
Figure 25:
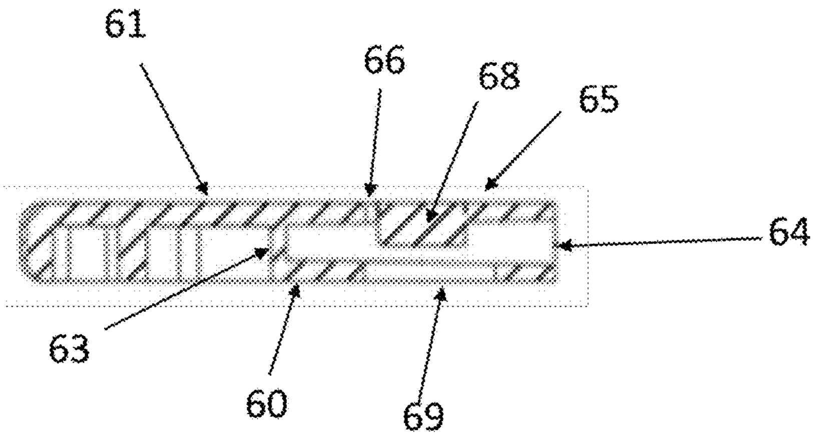
FIG. 25 is a longitudinal section view of the corner connector.
Figure 26:
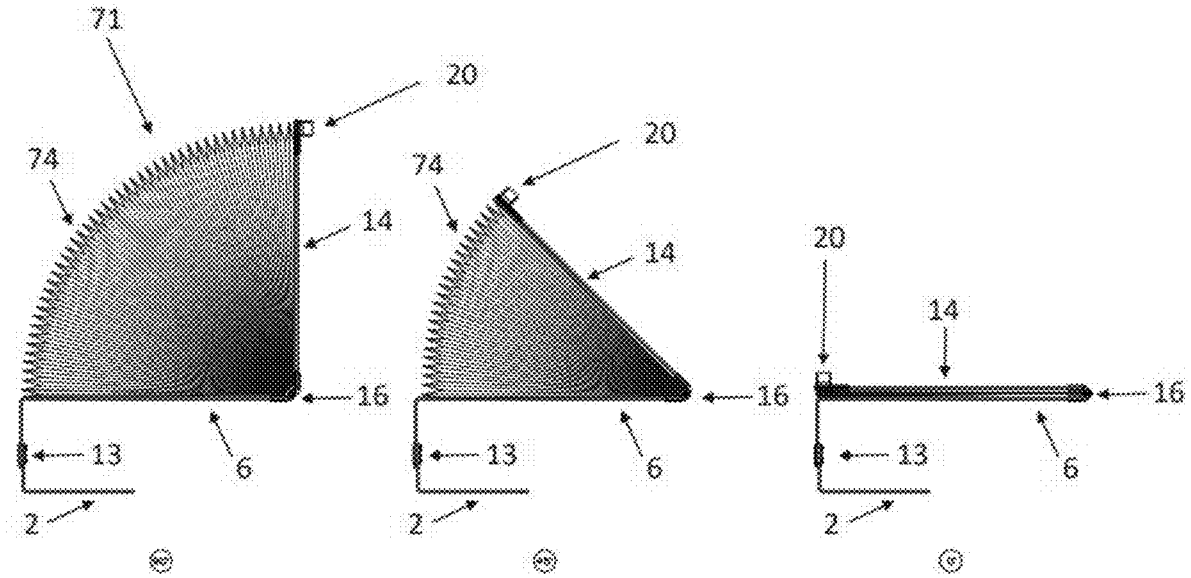
FIG. 26 is a set of side views of the cover placed on the structure illustrating 0, 45 and 90 degree operating positions of the enclosure.
Figure 27:
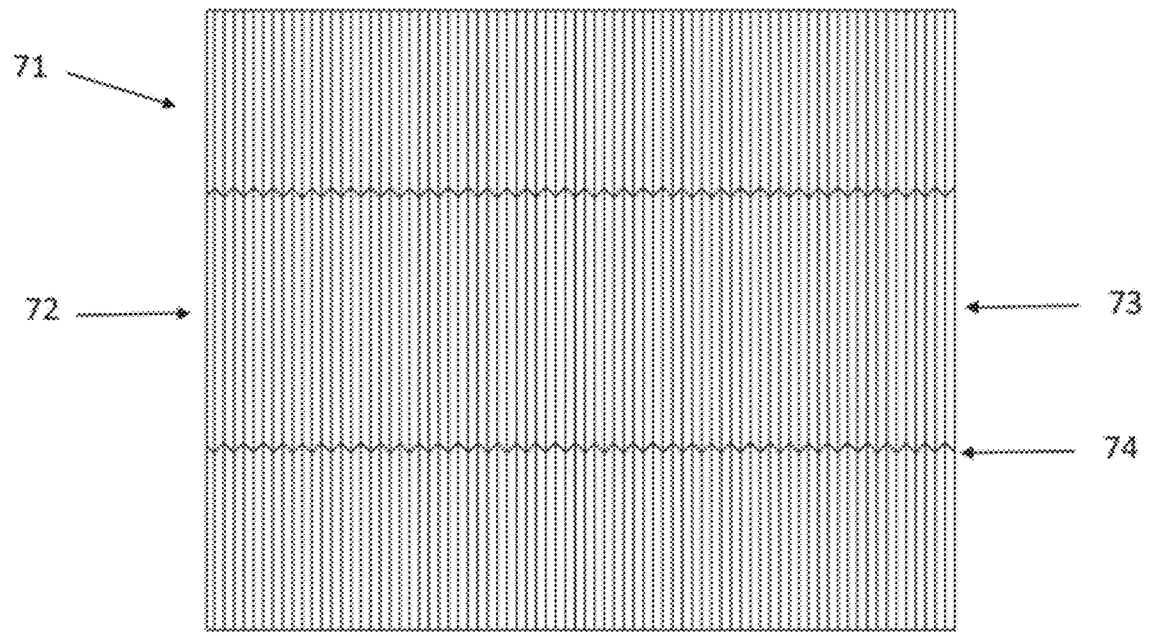
FIG. 27 is a top view of the unfolded cover placed on the cover structure.
Figure 28:
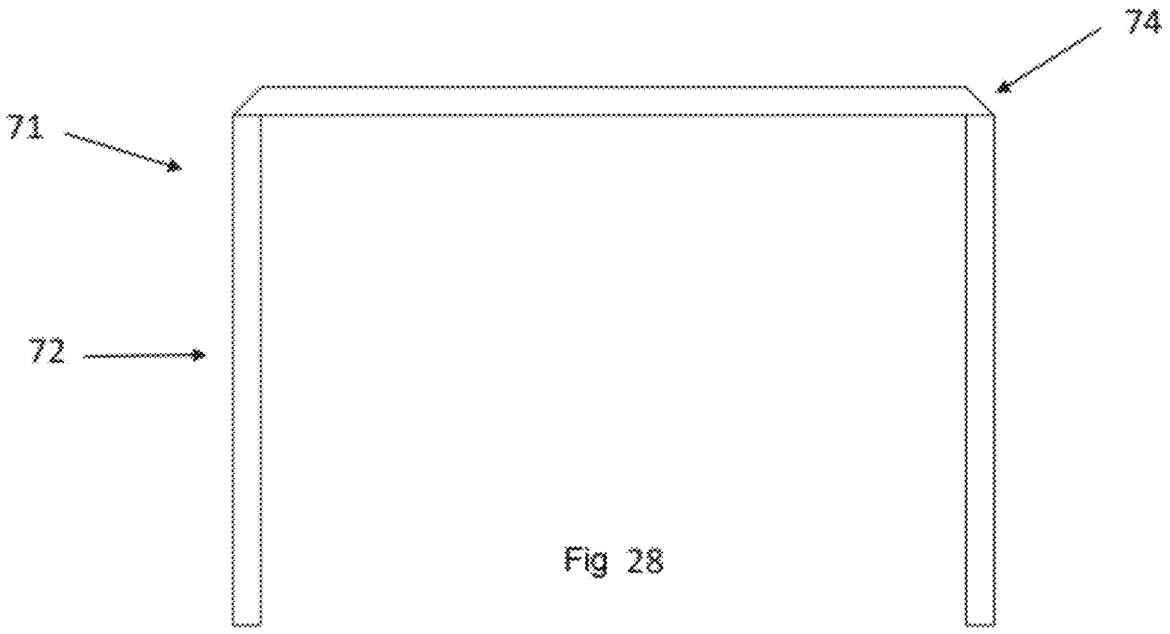
FIG. 28 is a front view of the folded cover placed on the cover structure.
Figure 29:
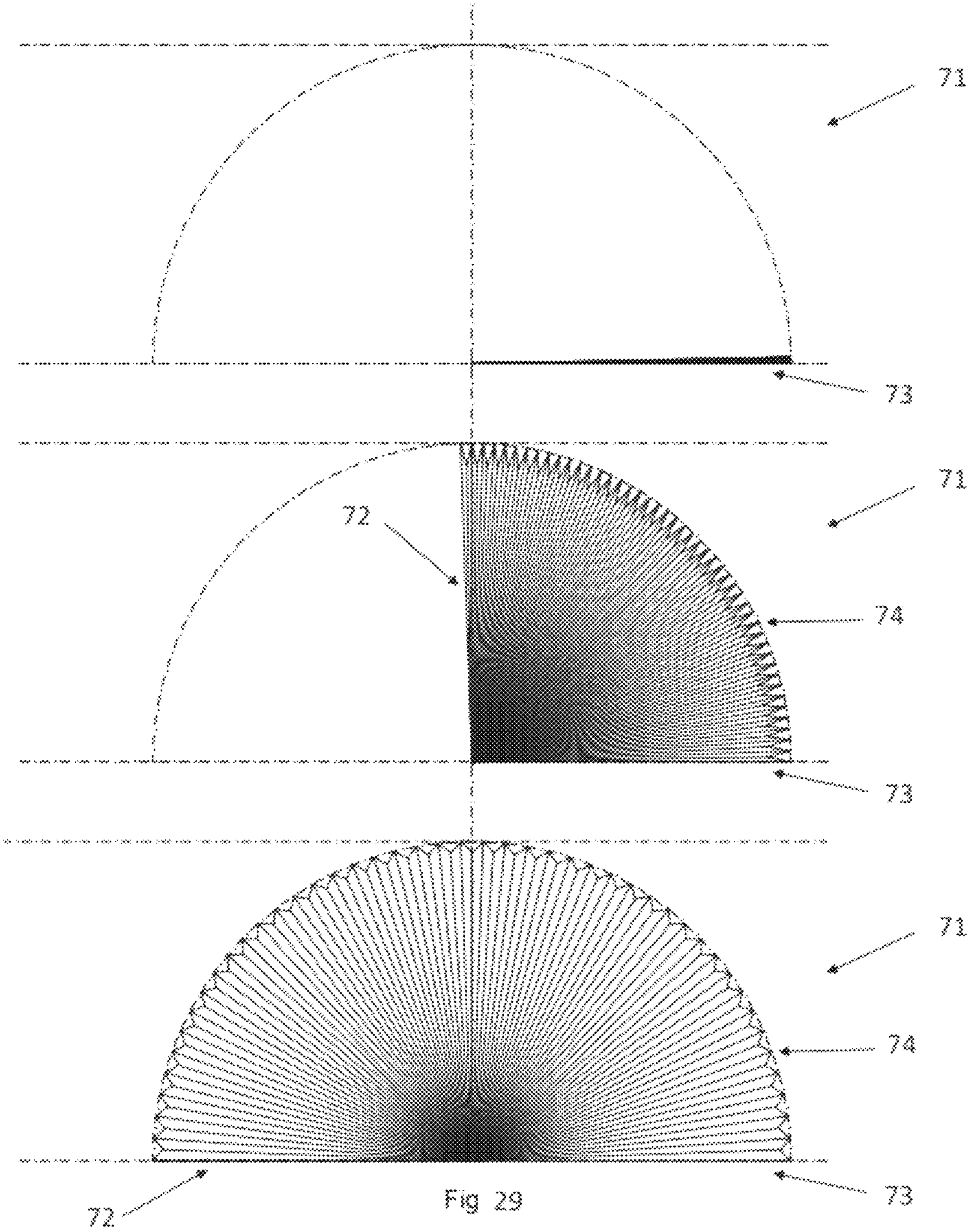
FIG. 29 is a set of side views of the cover that is placed on the cover structure illustrating 0, 90 and 180 degree operating positions of the enclosure.

FIGS. 23-25 show the corner connectors (21) in more detail. The corner connectors (21) join the free end of the rotating beam (14) with one end of the crossbar (17). The corner connectors (21) have two sections (58 and 59) coplanar and joined at 90° by a curved portion (70). Each of these sections (58 and 59) have a front wall (60), and a rear wall (61) with its lateral edges joined with lateral walls (62) and with its upper edge closed by a wall (63) defining a closed channel (64). The rear wall (61) has a tab (65) separated from the rear wall (61) by a substantially U-shaped separation slot (66), leaving a joining edge (67) by which the tab (65) is joined with the rear wall (61). The fastening tab (65) has on its internal face a protrusion (68) for engagement in the hole (15) of the rotating beam (14) or in one of the holes (18) of the crossbar (17). The fastening tabs (65) and (59) are flexibly movable to disengage the protrusion (68) from the fixing hole (15) of the rotating beam (14) and the fixing hole (18) of the crossbar (17) as required. The corner connector (21) has, in its front wall (60) an opening (69) coinciding with the fastening tab (65) to enable pushing the tab (65) through the opening to release the rotating beam (14) or the mobile crossbar (17), wherein the sections (58 and 59) are integrally and perpendicularly joined by a curved portion (70).

With reference to FIGS. 16-20, the connectors (13) serve to easily assemble and disassembled the enclosure. The connectors (13) have a first section (22) defined by a front wall (23), a rear wall (24) with its upper and lower edges joined or with upper (25) and lower (26) walls defining a passage or transverse channel (27). The rear wall (24) has a tab (28) separated from the rear wall (24) by a substantially U-shaped separation slot (29), defining a joining edge (30) of the tab (28) joined with the rear wall (24). On its internal face, the tap (28) has a protrusion (31) for engagement in one of the holes (9) for fastening of the support beam (6), remaining firmly joined at the desired height. The fastening tab (28) is flexibly movable so as to enable disengagement of the protrusion from the hole (9) of the support beam as required. The first section (22) further has an opening (32) in its front wall (23) which opening coincides with the fastening tab (28) to be able to push the fastening tab (28) through the opening (32) to release the support beam (6). The front wall (23) also has fastening holes (33) coinciding with the perforations (5) of the fastening support (2) to be fixedly attached by fixing means.

The connectors (13) have a second section (34) defined by a front wall (35), a rear wall (36) with its side edges joined (43) and with its upper edge closed by the wall (26) defining a closed channel (42), wherein the rear wall (36) has a tab (37) separated from the rear wall (36) by a substantially U-shaped separation slot (38), which leaves a joining edge (39) of said tab (37) joined with the rear wall (26). The fastening tab (37) has on its internal face a protrusion (40) for engagement in one of the holes (12) of the fixed crossbar (11). The fastening tab (37) is flexibly to disengage the fastening tab (37) from the fixing hole (12) of the fixed crossbar (11) as required. The second section (34) further has in Its front wall (35) an opening (41) coinciding with the fastening tab (37) to be able to push the fastening tab (37) through the opening to release the fixed crossbar (11).

The connectors (13) can be made in a single piece, and the fastening tabs (28 and 37) face each other, as well as the openings (32 and 41).

In an embodiment, the support beams (6) and the rotating beams (14), are joined by respective hinges (16) which enable pivoting of the rotating beams (14) relative to the support beams. With reference to FIGS. 21-22, the hinge (16) has two sections (43 and 44) joined by a rotation axis or bolt (45), each of the sections (43 and 44) being formed by a front wall (46), a rear wall (47) with its lateral edges joined with lateral walls (48) and with its upper edge closed by a wall (49) defining a closed channel (50), wherein the rear wall (47) has a tab (51) separated from the wall rear (47) by a substantially U-shaped groove (52) leaving a joining edge (53) by which the tab (51) is joined with the rear wall (47). The fastening tab (51) has on its internal face a protrusion (54) for engagement in the hole (10) of the support beam (6). The fastening tab (51) is flexibly movable to enable disengagement of the protrusion (51) from the fixing hole (12) of the support beam or of the rotating beam as required. Likewise, in its front wall (46), the hinge (16) has an opening (55) coinciding with the fastening tab (51) to be able to push the fastening tab (51) through the opening to release the support beam (6) or the rotating beam (14), wherein one of the sections (43) has two lateral arms (56) at its upper edge with a through hole (not illustrated) and the other section (44) has at its upper edge a central tab (57) with a through hole (not illustrated) coinciding with the through holes of the lateral arms (56) of the section (43) so that the central tab (57) remains between the lateral arms (56) of the section (43) through which the pivot pin or axis (45) passes, so as to couple the sections (43 and 44) rotationally.

The privacy cover has a disposable paper cover or curtain (71) with pleats (74), where the rear edge (73) of the paper cover is attached through adhesive with the support beam (6) and the front edge (72) of the paper cover is attached through adhesive to the rotating beam (14).

FIGS. 26 to 29 illustrate how the paper cover folds and unfolds when the rotating beam is rotated.

The product was designed for easy assembly and storage by non-specialized personnel. The base is held on the side of the head of the mattress. In this way, its own weight coupled with that of the patient fixes the structure of the cover. Hospital staff can change the paper cover (71) as often as is convenient. This allows diffuse light to enter, while regulating visual contact between the patient and others. The patient has a handle or handle (20) on the top of the frame that allows him to operate it intuitively, similar to a curtain. The structure has specific hinges (16) that keep the roof in the desired range.

The privacy enclosure is composed of a structure and a disposable paper cover (71).

The structure has a longer useful life, as its materials are aluminum, ABS plastic and stainless steel. On the other hand, the cover (71) has a shorter life cycle due to the hygiene and alternation of patients, which is why its material is pleated paper and is disposable. It should be added that the structure is easy to assemble and disassemble for quick storage or installation.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

The invention claimed is:

1. A privacy enclosure for a patient on a stretcher, comprising:

a mount for mounting the enclosure on the stretcher;

a pair of support beams extending from the mount in parallel spaced relation to each other;

a pair of rotating beams, each said rotating beams connected to a respective free end of the support beams for pivoting of the rotating beams relative to the support beams;

a crossbeam extending transversely between the rotating beams and connecting the rotating beams at a respective free end thereof; and a disposable paper cover attached to the support beams and the rotating beams, and shaped so that when the rotating beams rotate, the disposable paper cover folds or unfolds covering or uncovering a user;

wherein the mount comprises a pair of L-shaped members having a horizontal section and a vertical section, said support beams each have a vertical section attached to the vertical section of a respective one of the L-shaped members.

2. The privacy enclosure of claim 1, further comprising a crossbeam having opposing ends respectively attached to the vertical sections of the L-shaped members.

3. The privacy enclosure of claim 2, further comprising connectors fixedly attached to the vertical section of a respective one of the L-shaped members, said connectors each having a first channel and a second channel oriented perpendicular to the first channel, said vertical section of the support beams received in the first channel, said ends of the further crossbeam received in the second channel.

4. The privacy enclosure of claim 3, wherein the vertical sections of the support beams comprise a plurality of aligned holes and wherein an inner wall of the first channel has a flexibly movable tab releasably engageable in the aligned holes for adjustment of a position of the L-shaped members along the vertical section of the support beams.

5. The privacy enclosure of claim 1, further comprising corner connectors (21) which join the free end of the rotating beam 14 with one end of the crossbeam 17, said corner connectors each having a first closed channel and a second closed channel oriented perpendicularly, said free end of the rotating beam 14 received in the first closed channel, and one end of the crossbar received in the second closed channel.

6. The privacy enclosure of claim 5, wherein the one end of the rotating beam 14 comprise hole and wherein an inner wall of the first closed channel of corner connector, has a flexibly movable tab releasably engageable in the hole for attach or detached of a position, and one end of the crossbar comprise hole, and wherein an inner wall of the second closed channel of the corner connector, has a flexibly movable tab releasably engageable in the hole for attach or detached of a position.

7. The privacy enclosure of claim 1, further comprising hinges (16) which join the support beams (6) and the rotating beams (14), which enable pivoting of the rotating beams (14) relative to the support beams, the hinge (16) has two sections (43 and 44) joined by a rotation axis or bolt (45), defining a first and second closed channel (50), wherein one ends support beams (6) is received in the first closed cannel (50), and one end of the rotating beams in received in the second closed channel (50).

8. The privacy enclosure of claim 7, wherein one end of the support beams 6 comprise hole and wherein an inner wall of the first closed channel of the hinge, has a flexibly movable tab releasably engageable in the hole for attach or detached of a position, and one end of the rotating beams comprise hole, and wherein an inner wall of the second closed channel of the hinge, has a flexibly movable tab releasably engageable in the hole for attach or detached of a position.

9. The privacy enclosure of claim 1, wherein the crossbeam comprises a generally central handle.

10. The privacy enclosure of claim 1, wherein the rotating beams and the support beams are connected to each other by respective hinged connectors.

11. The privacy enclosure of claim 1, wherein the disposable paper cover or curtain (71) has pleats (74), wherein a rear edge (73) of the paper cover is engaged through adhesive with the support beam (6) and a front edge (72) of the paper cover is attached through adhesive to the rotating beam (14).

* * * * *